US012252826B2

(12) United States Patent
Tsai (10) Patent No.: US 12,252,826 B2
(45) Date of Patent: Mar. 18, 2025

(54) METHODS OF SATURATING NONWOVEN FABRICS WITH LIQUID AND THE MAKING OF ELECTRET THEREOF

(71) Applicant: University of Tennessee Research Foundation, Knoxville, TN (US)

(72) Inventor: Peter Ping-Yi Tsai, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 1010 days.

(21) Appl. No.: 17/056,276

(22) PCT Filed: May 17, 2019

(86) PCT No.: PCT/US2019/032935
§ 371 (c)(1),
(2) Date: Nov. 17, 2020

(87) PCT Pub. No.: WO2019/222668
PCT Pub. Date: Nov. 21, 2019

(65) Prior Publication Data
US 2021/0262134 A1    Aug. 26, 2021

Related U.S. Application Data

(60) Provisional application No. 62/672,984, filed on May 17, 2018.

(51) Int. Cl.
*D06B 5/08* (2006.01)
*D06B 1/02* (2006.01)
(Continued)

(52) U.S. Cl.
CPC ............... *D06B 5/08* (2013.01); *D06B 1/02* (2013.01); *D06B 15/04* (2013.01); *H01G 7/023* (2013.01); *Y10T 29/49226* (2015.01)

(58) Field of Classification Search
CPC .. B01D 2239/0435; D06B 15/04; D06B 5/08; D06B 1/04; Y10T 442/2008;
(Continued)

(56) References Cited

U.S. PATENT DOCUMENTS 4,798,850 A   1/1989   Brown
5,401,446 A   3/1995   Tsai et al.
(Continued)

FOREIGN PATENT DOCUMENTS

CN    1192790      9/1998
CN    104271827    1/2015
(Continued)

OTHER PUBLICATIONS

International Preliminary Report on patentability corresponding to U.S. Applin. No. PCT/US2019/032935 dated Nov. 17 2020.
(Continued)

*Primary Examiner* — Thiem D Phan
(74) *Attorney, Agent, or Firm* — Jenkins, Taylor & Hunt, P.A, (57) ABSTRACT

A method of preparing an electret by saturating a nonwoven fabric with a liquid, such as water, and removing the liquid via suction to generate charges by friction between the fabric fibers and the liquid is described. The saturating can be carried out, for example, by impinging the bottom side of the fabric with a jet or jets of water while the fabric is being pulled under a solid roller. Excess water can also be applied during a water quenching step of a meltblowing or spunbonding process. An apparatus for preparing an electret according to the presently disclosed methods is also described.

10 Claims, 2 Drawing Sheets

(51) Int. Cl.
*D06B 15/04* (2006.01)
*H01G 7/02* (2006.01)

(58) Field of Classification Search
CPC ............. Y10T 442/2475; Y10T 442/68; Y10T 442/608; Y10T 29/49226
USPC ................................ 29/886, 419.1, 428, 592
See application file for complete search history.

(56) References Cited

U.S. PATENT DOCUMENTS

| | | | |
|---|---|---|---|
| 5,496,507 | A | 3/1996 | Angadjivand et al. |
| 5,908,598 | A | 6/1999 | Rousseau et al. |
| 6,213,122 | B1 | 4/2001 | Rousseau et al. |
| 6,444,312 | B1* | 9/2002 | Dugan ............... D04H 3/02 428/374 |
| 6,969,484 | B2 | 11/2005 | Horiguchi et al. |
| 7,765,698 | B2* | 8/2010 | Sebastian ........... B01D 39/1623 422/534 |
| 2002/0110610 | A1 | 2/2002 | Angadjivand et al. |
| 2002/0190434 | A1 | 12/2002 | Eitzman et al. |
| 2004/0023577 | A1 | 2/2004 | Horiguchi et al. |
| 2004/0177758 | A1 | 9/2004 | Tsai et al. |
| 2005/0215156 | A1 | 9/2005 | Ferencz et al. |
| 2006/0254419 | A1 | 11/2006 | Leonard |
| 2009/0253323 | A1 | 10/2009 | Mueller et al. |
| 2014/0120322 | A1 | 5/2014 | Fu et al. |
| 2017/0121875 | A1 | 5/2017 | Schultz et al. |

FOREIGN PATENT DOCUMENTS

| | | |
|---|---|---|
| CN | 112218981 A | 1/2021 |
| EP | 3794171 B1 | 11/2023 |
| WO | WO 1997/042366 | 11/1997 |
| WO | WO 01/027371 | 4/2001 |
| WO | WO2013/165287 A1 | 11/2013 |
| WO | WO2019/222668 A1 | 11/2019 |

OTHER PUBLICATIONS

International Search Report and Written Opinion of the International Searching Authority corresponding to U.S. Applin, No. PCT/US 2019/032935 dated Sep. 11, 2019.
Notice of Publication of the International Application corresponding to U.S. Applin. No PCT/US2019/032935 dated Nov. 21, 2019.
Office Action corresponding with Chinese Applin. No. 2023060100130580 dated Feb. 8, 2022.
Office Action corresponding with Chinese Applin. No. 2023060100130580 dated Dec. 2, 2022.
Office Action corresponding with Chinese Applin. No. 2023060100130580 dated Jun. 1, 2023.
Qin et al., (1999), "The Effect of Water-quenching on the Electrostatic Charging of Fibers and Fabrics during the Melt-blowing Process," The Textile Institute 90:2, p. 243-251.
Tsai et al., (1998) "Theory and techniques of electrostatic charging of melt-blown nonwoven webs," TAPPI Journal, vol. 81, No. 1; pp. 274-278.
Russell, S.J., "Handbook of Nonwovens", Topic: Technology & Engineering, Woodhead Publishing, 2006, 1 page.
Tsai, P.P.-Y, et al., "Characterization of Melt Blown Web Properties Using Air Flow Technique", International Nonwovens Journal, vol. 8, No. 2, Fall, 1999 , 8 pages.
Extended European Search Report received in EP Patent Application No. 19802807.8, mailed on Feb. 7, 2022, 10 pages.
Office Action received in EP Patent Application No. 19802807.8, mailed on Jan. 3, 2023, 3 pages.
Intention to Grant received in EP Patent Application No. 19802807.8 mailed on Jun. 21, 2023, 28 pages.

* cited by examiner

METHODS OF SATURATING NONWOVEN FABRICS WITH LIQUID AND THE MAKING OF ELECTRET THEREOF

CROSS-REFERENCE TO RELATED APPLICATIONS

This application claims benefit of U.S. Provisional Patent Application Ser. No. 62/672,984, filed May 17, 2018, which is herein incorporated by reference in its entirety.

TECHNICAL FIELD

The presently disclosed subject matter relates to methods of saturating nonwoven fabrics and the preparation of electrets thereof. The presently disclosed subject matter further relates to apparatus for preparing electrets.

BACKGROUND

Fibrous materials such as nonwoven fabrics are widely used as filter media thanks to their high surface area, which contributes to high filtration efficiency and low pressure drop. Electrostatic charging can increase the filtration efficiency of fibrous materials through the electrostatic attraction of particles by charges embedded in the fibers. There are several methods in charging the nonwoven fabrics, including corona charging, induction, and triboelectrification, among others.

Corona discharge embeds charges generated by coronal discharge from the air or other gases by applying a high voltage on a sharp metal device to a fiber sheet. In triboelectrification methods, charges are generated through electron or ion transfer from one fiber to another via friction and triboelectrification is normally carried out using two fibers having different electronegativities and combing them through a carding process. Triboelectrifcation is more time-consuming and more tedious in doing the charging than corona charging. However, triboelectrification can achieve a higher filtration efficiency than corona charging.

Hydrocharging relates to a method wherein a fiber web is impinged with a liquid, such as water, to create charge. For instance, U.S. Pat. No. 5,496,507 describes a method of hydrocharging filter media that uses high pressure water droplets to impinge fibers of a filter media from above the top surface of the filter media while sucking water out from below. U.S. Pat. No. 6,969,484 describes a hydrocharging method using high vacuum pressure to suck water from a reservoir though a fabric to provide an electret. However, as described in U.S. Patent Application Publication No. 2006/0254419, the charging efficiencies produced by these two hydrocharging methods can be low unless the fabric is pre-charged via corona charging or the suction process is repeated multiple times.

Accordingly, there is an ongoing need for additional methods for electrostatically charging fabrics.

SUMMARY

In some embodiments, the presently disclosed subject matter provides a method of making an electret. In some embodiments, the method comprises: (a) providing a sheet comprising a nonwoven web of thermoplastic fibers; (b) passing the sheet under a roller wherein the top surface of the sheet is in contact with the roller while simultaneously impinging the bottom surface of the sheet with one or more jets of water, thereby saturating the sheet with water to provide a saturated sheet; and (c) removing the water from the saturated sheet via suction to provide a charge, thereby providing an electret. In some embodiments, the method further comprises drying the sheet.

In some embodiments, the thermoplastic fibers comprise a polyolefin. In some embodiments, the polyolefin is polypropylene. In some embodiments, the thermoplastic fibers comprise an additive. In some embodiments, the thermoplastic fibers are melt blown or spunbonded fibers. In some embodiments, the nonwoven web has a basis weight of between about 15 grams per square meter (gsm) and about 40 gsm.

In some embodiments, the one or more jets of water are directed to the bottom surface of the sheet at a pressure between about 75 pounds per square inch (psi) and about 1,000 psi. In some embodiments, the one or more jets of water are directed to the bottom surface of the sheet using one or more nozzles having an equivalent orifice diameter between about 0.011 inches and about 0.075 inches. In some embodiments, the water has a conductivity of less than 10 microsiemens ($\mu$S).

In some embodiments, the presently disclosed subject matter provides an apparatus for preparing an electret. In some embodiments, the apparatus comprises: (i) one or more nozzles and a solid roller, wherein the one or more nozzles are positioned beneath the solid roller and are configured to direct one or more jets of water upward to the solid roller; (ii) a vacuum chamber comprising a vacuum port and an opening; and (iii) a series of rollers configured to transfer a fabric sheet from a first location above the one or more nozzles and under the solid roller to a second location above the opening of the vacuum chamber.

In some embodiments, the one or more nozzles are attached to a water manifold configured to provide water to the one or more nozzles. In some embodiments, the apparatus comprises a water reservoir located under the solid roller and the one or more nozzles. In some embodiments, the water reservoir further comprises a water pump to pump water from the water reservoir, thereby recycling the water.

It is an object of the presently disclosed subject matter to provide methods of preparing electrets and related apparatus.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The presently disclosed subject matter will now be described more fully. The presently disclosed subject matter can, however, be embodied in different forms and should not be construed as limited to the embodiments set forth herein below. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, components, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, pressure, weight, volume, size, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "electret" as used herein refers to a fibrous polymer material that is electrically charged. The electric field produced by the electret can be used to attract other materials, such as dust particles, e.g., from an air flow or other fluid passed through the electret. Thus, the attractive properties exhibited by electrets provides for filter materials to be constructed that have the ability to capture sub-micron particles even when the pore size of the polymer material is many times larger. Electrets are useful in many applications, including, but not limited to air filters, furnace filters, respiratory filters, face masks, and electro-acoustic devices, headphones, and electrostatic recorders.

The term "fluid" as used herein refers to a material that flows, e.g., a liquid, a gas, a solid particulate collection, a fluidized particle suspension, or a multiphase mixture.

The term "pure water" refers to water produced by distillation, deionization, reverse osmosis, or other purification methods and can be characterized by having an electrical conductivity of less than 10 micro-Siemens (µS) per centimeter. In some embodiments, pure water is provided via a purification system that comprises a series of filters, reverse osmosis tanks, and resins that adjust electrical conductivity.

II. General Considerations

Electrostatic charging is a technique to increase the filtration efficiency of fibrous substrates, such as nonwoven fabrics, used, for example, as air filters, due to the additional attraction to particles provided by electrostatic charges. There are basically two types of electrostatic charging: coronal charging and triboelectrification. Hydrocharging, which refers to contacting a fibrous substrate with a liquid, e.g., water, to create an electret, can be considered as a third type. However, according to the presently disclosed subject matter, it can be also be considered theoretically as a type of triboelectrification, creating charge via friction between the liquid and the fiber.

Coronal charging is a process in which charges generated by coronal discharges from the air or other gases in an intensified electric field are embedded into fibers. U.S. Pat. No. 5,401,446 by Tsai and Wadsworth, herein incorporated by reference in its entirety, describes a coronal charging technique using a wire over a biased metal roller or a wire inside a biased or grounded metal shell, in which the coronal discharges take place around the wire when it is subjected to a high voltage. As reported by Tsai et al. (Theory and techniques of electrostatic charging of meltblown nonwoven webs, TAPPI Journal, Vol. 81, No. 1, 1996, 274-278), the highly intensified electrical field around the wire can ionize the air which can carry charges. The charges are accelerated by the electrical field and penetrate into the regions in the fiber media in contact with the air. The other side of the fiber media can be charged via induction by the biased roller.

The filtration efficiency of a coronally charged fabric is typically 10-fold higher than the corresponding uncharged fabric as shown in Table 1, below. Filter quality (qf) is defined as:

$$qf = \ln\left(\frac{1}{P}\right)/DP$$

where p is the penetration and DP is the pressure drop of the aerosol through the fabric. The results in Table 1 were collected using a TSI AFT-8130 automated filter tester (TSI Incorporated, Shoreview, Minn., United States of America).

TABLE 1

Coronal Charging of Meltblown Fabric.

| | Basis Weight (grams per square meter) | Penetration (%) | Pressure Drop (mmH$_2$O) | qf (1/mmH$_2$O) |
|---|---|---|---|---|
| Uncharged | 30 | 68 | 2.1 | 0.1836 |
| Charged | 30 | 2.4 | 2.1 | 1.7760 |

In a triboelectrification method described in U.S. Pat. No. 4,798,850 by Brown, herein incorporated by reference in its entirety, two dissimilar fibers, polypropylene (PP) and modified acrylic (modacrylic), were charged by passing them through a textile combing process. Charges were generated and transferred among the fibers by rubbing the fibers against each other. U.S. Patent Application Publication No. 2004/0177758 by Tai, herein incorporated by reference in its entirety, describes a triboelectrification method in which two dissimilar fibers, PP and nylon were used, and in which an approximately 20-fold improvement in filtration efficiency was shown. See Table 2, below. Results in Table 2 were collected using a TSI AFT-8110 automated filter tester (TSI Incorporated, Shoreview, Minn., United States of America).

TABLE 2

Triboelectrification of PP/nylon Needle-Punched Fabric (Tested Using TSI8110).

| | Basis Weight (grams per square meter) | Penetration (%) | Pressure Drop (mmH$_2$O) | qf (1/mmH$_2$O) |
|---|---|---|---|---|
| Uncharged | 75/25 | 0.87 | 0.7 | 6.7778 |
| Charged | 75/25 | 78 | 0.7 | 0.3549 |

The results of PP/modacrylic triboelectrification also typically show an approximately 20-fold improvement in filtration efficiency, as shown in Table 3, below. Like the results of Table 1, the results of Table 3 were collected using a TSI AFT-8130 automated filter tester (TSI Incorporated, Shoreview, Minn., United States of America).

TABLE 3

Triboelectrification of PP/modacrylic Needle-Punched Fabric (Tested Using TSI8130).

| | Basis Weight (grams per square meter) | Penetration (%) | Pressure Drop (mmH$_2$O) | qf (1/mmH$_2$O) |
|---|---|---|---|---|
| Uncharged | 100 | 5.82 | 0.7 | 4.0627 |
| Charged | 100 | 86 | 0.7 | 0.2155 |

Qin et al. (The Effect of Water-quenching on the Electrostatic Charging of Fibers and Fabric during the Meltblowing Process, The Journal of The Textile Institute, 90 Part 1, No. 2, 1999, pp. 243-251) suggests that fabric can carry charges by water quenching the fibers at a meltblowing die exit. For instance, it was suggested that the charging occurs as a result of the friction of the water droplets against the fibers. In U.S. Pat. No. 5,496,507, herein incorporated by reference in its entirety, electret was made by impinging high pressure water droplets into a fabric from above. But, while some water penetrates through the fabric using this approach, the majority bounces from the fabric and either dissipates into the environment or stays above the fabric until it finally flows off the fabric and is collected in some way. The water staying on the fabric can flow to the impinging area in a way that hinders the impinging pressure of the water droplets onto the fabric. U.S. Pat. No. 6,969,484, herein incorporated by reference in its entirety, describes a method that uses a high vacuum horn to suck water from a reservoir through a fabric to make electret (e.g., when the fabric is in contact with water in the reservoir). However, as indicated in U.S. Patent No. 2006/0254419, herein incorporated by reference in its entirety, these two previously described hydrocharging methods appear to provide low charging efficiency. To provide the highest filtration efficiencies according to these methods, several impinging suction passes or reverse passes were performed to saturate the charges in the fabric or pre-charging via corona charging was carried out. A method described in U.S. Patent No. 2006/0254419, herein incorporated by reference in its entirety, attempted to provide an improved hydrocharging method by using a semi-conductive or conductive grounded liquid to wet out and saturate the fabric. However, attempts to reproduce this method indicate that the use of a conductive liquid can fail to generate charges by friction.

III. Methods of Preparing Electrets

The presently disclosed subject matter provides, in some embodiments, a method of making an electret. In some embodiments, the method comprises saturating the pores of a nonwoven fabric with liquid and then removing the liquid from the pores via suction, e.g., to generate charges in fibers of the nonwoven fabric via friction between the fibers and the liquid. The method provides a filter media with high filtration efficiency without the need for pre-charging the fabric via corona charging, without the need for a wetting agent, and without the need for repeating the suction process multiple times.

In some embodiments, the liquid is water. In some embodiments, the water is pure water. For example, in some embodiments, the water is distilled water, filtered water, or deionized water and/or has a conductivity of less than about 10 µS.

In some embodiments, the fabric can be saturated by injection while the fabric is positioned under a solid roller. More particularly, the injection can be performed by positioning one or more nozzles beneath the bottom surface of the fabric, configured such that the one or more nozzles each shoot one or more jets of water or one or more streams of water droplets upward toward the underside of the fabric as it is being pulled under the solid roller (i.e., where the top surface of the fabric is in contact with the roller). In some embodiments, the pressure is between about 75 psi and about 1,000 psi, including about 75, 100, 200, 300, 400, 500, 600, 700, 800, 900 and about 1,000 psi. In some embodiments, the injection can be done at moderate pressure (e.g., between about 150 pounds per square inch (psi) and about 600 psi). The pressure can vary depending upon the size of the one or more nozzles, with smaller nozzles sizes using higher pressure.

Suitable nozzles include, but are not limited to, these sold by Spraying Systems Co. (Wheaton, Ill., United States of America) with product numbers 650067, 6501, and 6502. Nozzle 6502 from Spraying Systems Co. can spray a solid steam or flat pattern of water droplets with spray angle of 65°. Other spraying angles, such as 50 and 40 degrees, are available from Spraying Systems. Nozzle sizes ranging from 0017, which has an equivalent orifice diameter of 0.011 inches, to 09 (equivalent orifice diameter of 0.075 inches) are examples of nozzle sizes that can be employed for fabric basis weights between about 5 gsm and about 100 gsm. By way of particular but non-limiting examples, in some embodiments, nozzle sizes from 0067 (equivalent orifice diameter of 0.021 inches) to 03 (equivalent orifice diameter of 0.043 inches) are suitable for the above fabric basis weight. In some embodiments, a representative pressure is 300 psi for nozzle 6502, a representative pressure is 600 psi for nozzle 6501, and a representative pressure is 900 psi for nozzle 650067.

In some embodiments, the one or more nozzles are attached to a manifold located under the solid roller, such that the manifold spans the width of the fabric as it is pulled lengthwise under the solid roller. In some embodiments the manifold is positioned inside a reservoir (e.g., a metal tank) that can catch excess liquid that falls back off/is reflected from the bottom surface of the fabric. In some embodiments, the reservoir can include one or more pumps to pump reflected water out of the reservoir, such as back to a purification system. In some embodiments, the reservoir is connected a pump that recycles the water that is reflected from the bottom surface of the fabric and into the reservoir by pumping the water back to the purification system, wherein it can be sprayed at another section of the bottom surface of the fabric as it passes under the solid roller.

Alternatively or additionally, the fabric can be saturated by wetting the fibers of the fabric sheet with an excess of water during water quenching of the fibers during a meltblowing or spunbonding process. For example, water droplets can be sprayed onto fibers at the die exit of a meltblowing or spunbonding process to wet out the fiber surface. See, e.g., FIG. 2, discussed herein below. In some embodiments, the excess of water can be a water volume equal to about 10 times the fabric weight. In some embodiments, the water droplets can be sprayed using a hydroentangler. In some embodiments, the water quenched fabric can also be passed through a liquid reservoir or through the injection process described above, but optionally using a lower injection pressure. Thus, in some embodiments, the saturation involves more than one step. As described in an article by Tsai (International Nonwovens Journal, Volume 8 No. 2, Fall, 1999, 8 pages), porosity is the void fraction of a fabric uncovered by fibers. A porosity of 85%-95%, including particularly 88%-92%, can be employed for hydrocharging. Saturation of a fabric by liquid means that the void is occupied by liquid. For example, for a fabric basis weight of 30 gsm, if its porosity is 900%, then the weight of water to saturate the fabric is about 300 gsm, calculated from 30×9/ 0.91(density of PP).

Accordingly, in some embodiments, the presently disclosed subject matter provides a method of making an electret, the method comprising: saturating a sheet comprising a nonwoven fabric with water to provide a saturated sheet; and removing water from the saturated sheet via suction to provide a charge, thereby providing an electret. In some embodiments, the method further comprises drying the sheet to remove any residual water (e.g., by propelling the sheet through an oven). Drying of the electret can be done, for example, at a temperature selected to reduce potential damage to the fibers in the electret sheet. In some embodiments, the drying temperature is about 130° C. or less (e.g., about 100° C. or less, or about 70° C. or less) for between about 30 seconds to 1 minute. In some embodiments, the drying temperature is between about 60° C. and about 70° C.

In some embodiments, the saturating comprises passing a sheet of nonwoven fabric under a roller wherein the top surface of the sheet is in contact with the roller while simultaneously impinging the bottom surface of the sheet with one or more jets of water. In some embodiments, the saturating comprises water quenching fibers during meltblowing or spunbonding production of the fibers with an excess of water (e.g., using ten times the amount of water per weight of the fibers) and preparing a nonwoven fabric of the quenched fibers. In some embodiments, the saturating comprises water quenching fibers using an excess of water; preparing a nonwoven fabric sheet of the fibers and passing the fabric through a water reservoir. In some embodiments, the saturating comprises water quenching fibers using an excess of water (e.g., using a hydroentangler); preparing a nonwoven fabric sheet of the fibers and passing the sheet of nonwoven fabric under a roller wherein the top surface of the sheet is in contact with the roller while simultaneously impinging the bottom surface of the sheet with one or more jets of water.

In some embodiments, the method comprises: (a) providing a sheet comprising a nonwoven web of thermoplastic fibers; (b) passing the sheet under a roller wherein the top surface of the sheet is in contact with the roller while simultaneously impinging the bottom surface of the sheet with one or more jets of water, thereby saturating the sheet with water to provide a saturated sheet; and (c) removing the water from the saturated sheet via suction to provide a charge, thereby providing an electret. In some embodiments, the method further comprises drying the sheet. In some embodiments, providing a sheet comprising a non-woven web of thermoplastic fibers comprises preparing thermoplastic fibers via a meltblowing or spunbonding process, water quenching the fibers with an excess of water, and preparing a sheet of the fibers.

By using water impingement directed to a bottom surface of the sheet, the presence of a vacuum located under the fabric during saturation is not needed, as in the method described in U.S. Pat. No. 5,496,507. Further, excess water can be easily collected and recycled by placing a reservoir under the sheet and the impingement nozzle or nozzles. In addition, since the excess water from falls off the sheet rather than pooling on it, the excess water does not interfere with the impingement and saturation of other sections of the sheet.

The nonwoven fabric can comprise nonconductive thermoplastic fibers (e.g., having a resistivity greater than $10^{14}$ ohm cm) prepared from a nonconductive thermoplastic resin. Any thermoplastic nonconductive polymer resin can be used. Suitable nonconductive polymer resins include, but are not limited to, polyolefins, such as polypropylene, polyethylene, and poly-4-methyl-1-pentene; polyvinyl chloride (PVC); polystyrene; polycarbonates, polyesters, and copolymers and blends thereof. In some embodiments, the nonwoven fabric comprises or consists of polypropylene fibers. In some embodiments, the fibers are meltblown or spunbonded fibers (e.g., meltblown or spunbonded PP fibers). Melt blown microfibers useful in the presently disclosed subject matter can be prepared as described in Wente et al. ("Manufacture of Superfine Organic Fibers," Report No. 4364 of the Navel Research Laboratories, 1954).

In some embodiments, the nonwoven fabric comprises nonconductive thermoplastic fibers that comprise a blend of a nonconductive thermoplastic resin and an additive, such as those described, for example, in U.S. Pat. Nos. 5,908,598 and 6,969,484, each of which is incorporated herein by reference in its entirety. Such additives include fluorochemical additives (e.g., compounds and oligomers that comprise at least one perfluorinated moiety); hindered-amine and/or triazine-based additives (e.g., triazine compounds or oligomers containing at least one nitrogen atom in addition to those in the triazine group); and combinations thereof. The additives can be blended with the thermoplastic resin, pelletized and formed into fibers by methods known in the art. In some embodiments, the pellets can be meltblown to form fibers. In some embodiments, the additives can be added to the thermoplastic resin pellets at the extruder and melt extruded. Accordingly, the additives useful according to the presently disclosed subject matter are those that are thermally stable at the extrusion temperature of the thermoplastic resin. In some embodiments, the additives have a molecular weight of above about 500. More particularly, in some embodiments, the fluorochemical additives include, but are not limited to, short-chain tetrafluoroethylene telomers, fluoroaliphatic alkanes comprising between 20 and 30 carbon atoms, and other compounds comprising perfluorinated moieties having between about 3 and about 20 carbon atoms.

In some embodiments, the nonwoven fabric has a basis weight of between about 5 grams per square meter (gsm) and about 100 gsm (e.g., about 5, 10, 15, 20, 25, 30, 35, 40, 45, 50, 55, 60, 65, 70, 75, 80, 85, 90, 95 or about 100 gsm). The thickness can range from about 0.05 mm to about 2 mm for meltblown fabric. The thickness can be higher for spunbonded or other types, e.g., needle-punched, fabrics.

Nonwoven fabric sheets of different basis weights comprising meltblown polypropylene fibers were hydrocharged according to a method of the presently disclosed subject matter wherein the fabric sheets were saturated by impingement with water jets while the sheet was being drawn under a solid roller and the water was then removed via suction. The meltblown fibers were prepared from a resin comprising polypolypropylene homopolymer (sold under the tradename ACHIEVE™ Advanced PP6936G2 from ExxonMobil, Irving, Tex., United States of America) and 1 weight percent of a polypropylene process enhancer (a nucleating agent) (PPM110829, Techmer P M, Clinton, Tenn., United States of America), added to make a fluffier fabric with lower pressure drop. The water nozzle (6502 from Spraying Systems Co., Wheaton, Ill., United States of America) was used for water injection of pure water (conductivity of 0.9 µS) at 300 psi. The charged sheets were tested using a TSI AFT-8130 automated filter tester (TSI Incorporated, Shoreview, Minn., United States of America). An uncharged sheet was also tested for comparison. Results are shown in Table 4, below.

TABLE 4

Hydrocharging of Meltblown Fabric.

| Type | Status | Basis Weight (gsm) | Penetration (%) | Pressure Drop (mmH$_2$O) | qf (1/mmH$_2$O) |
|---|---|---|---|---|---|
| I | Charged | 15 | 28 | 0.3 | 4.2432 |
| II | Charged | 15 | 11.8 | 0.6 | 3.5618 |
| III | Charged | 15 | 1.85 | 1.2 | 3.3250 |
| IV | Charged | 20 | 0.233 | 1.7 | 3.5658 |
| V | Uncharged | 25 | 63.5 | 2.4 | 0.1892 |

TABLE 4-continued

Hydrocharging of Meltblown Fabric.

| Type | Status | Basis Weight (gsm) | Penetration (%) | Pressure Drop (mmH$_2$O) | qf (1/mmH$_2$O) |
|---|---|---|---|---|---|
| V | Charged | 25 | 0.0184 | 2.4 | 3.5836 |
| VI | Charged | 35 | 0.002 | 3.1 | 3.4903 |

Based on these results, the presently disclosed methods are believed capable of providing results as described in Table 5 for fabrics of Types I-VI, which vary according to the basis weight of the fabric.

TABLE 5

Expected Minimal Filter Efficiencies by Fabric Type.

| Types | B. Wt (gsm) | FE (%) | P. Drop |
|---|---|---|---|
| I | 15-20 | 65 | 3-4 Pa |
| II | 15-20 | 85 | 6-8 Pa |
| III | 15-25 | 95 | 10-15 Pa |
| IV | 20-25 | 99.5 | 18-25 Pa |
| V | 25-35 | 99.97 | 25-35 Pa |
| VI | 30-40 | 99.995 | 30-40 Pa |

IV. Apparatus for Making an Electret

Figure 1:
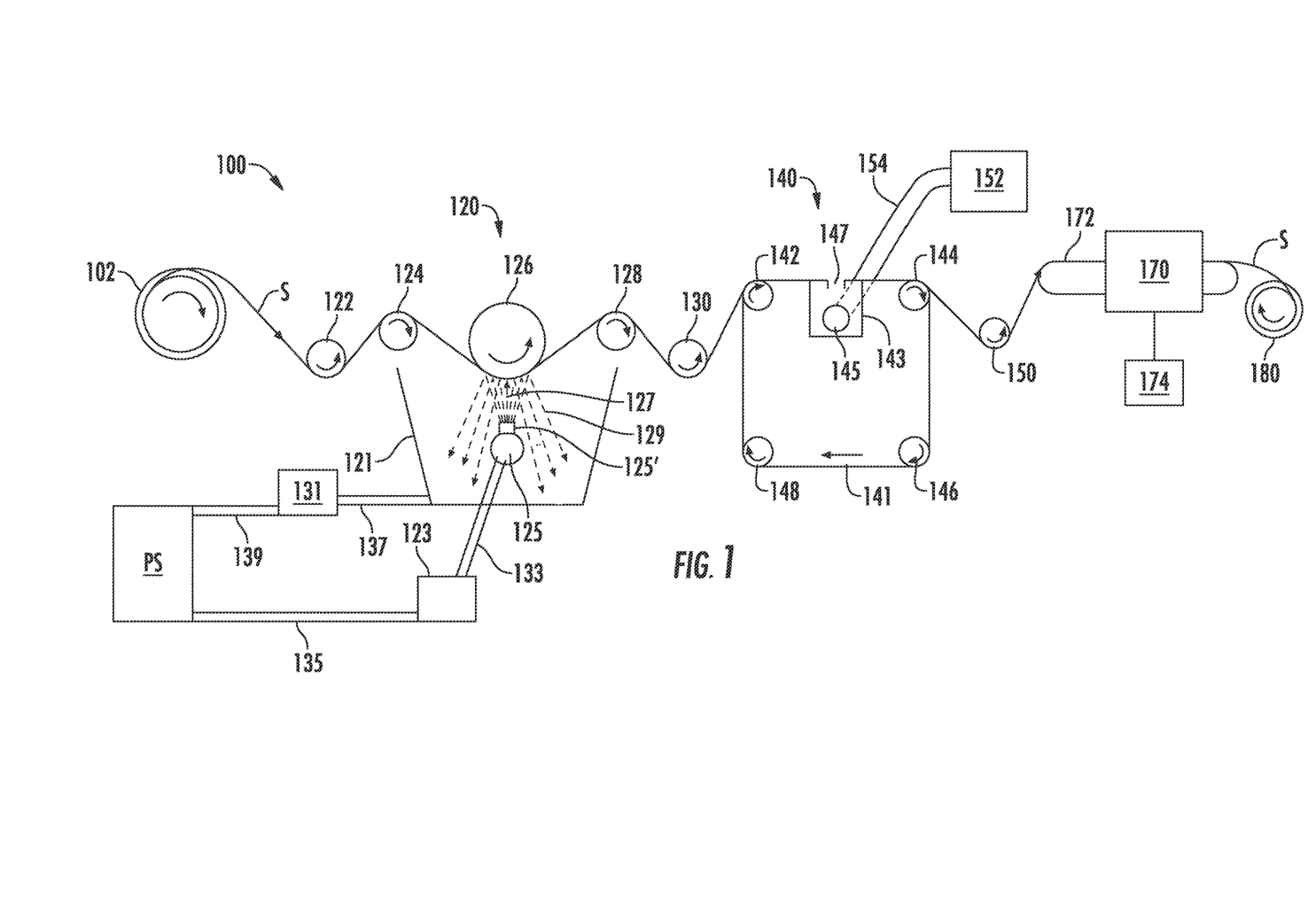
FIG. 1 is a schematic diagram illustrating an exemplary apparatus for saturating a nonwoven fiber sheet with liquid and preparing an electret according to the presently disclosed subject matter.

Exemplary apparatus 100 for preparing an electret according to the presently disclosed methods is shown in FIG. 1. Apparatus 100 includes two sections or zones, saturating zone 120 and suctioning zone 140. As shown in FIG. 1, sheet S of a nonwoven fabric can be propelled using unwinder 102 over guide rollers 122 and 124 under a solid roller 126 where the top surface of sheet S is in contact with solid roller 126. Water, in some embodiments, pure water, is pumped from a purification system PS using water pump 123 to water manifold 125 via water lines 133 and 135. In some embodiments, the purification system PS comprises a series of filters, reverse osmosis tanks, and resins that adjust electrical conductivity. Water is then sprayed toward the bottom surface of sheet S via water nozzle 125' when sheet S is being pulled under solid roller 126. Water jets 127 from water nozzle 125' impinge the bottom surface of sheet S and excess water 129 bounces off sheet S and into water reservoir 121 where it can be pumped back to purification system PS using second water pump 131 via water lines 137 and 139, thus recycling the water for saturation of another section of sheet S. If desired, water manifold 125 can include two or more or three or more water nozzles arranged linearly so that water jets from the two or more or three or more nozzles hit the bottom surface of sheet S at different points along the width of sheet S. The water nozzles can be oriented or chosen such that water comes out at different angles, which can facilitate saturation of sheet S.

In the meantime, continuing with FIG. 1, after impingement with water jets 127, sheet S is propelled out of saturating zone 120 using guide rollers 128 and 130 to suctioning zone 140. Belt 141 is pulled in a circuit using rollers 142, 144, 146 and 148 (one or more of which is powered to drive the belt) and pulls sheet S over one or more vacuum chambers 143 which contains a vacuum port 145. In some embodiments, one of rollers 142, 144, 146, and 148 can be powered by a motor. At least one opening or slit 147 is present so that the vacuum chamber can come into contact with the bottom surface of sheet S as it passes over vacuum chamber 143, suctioning water from the pores to produce a charge. In some embodiments, belt 141 is porous, and can comprise, for example, a mesh screen or fabric to provide one or more open areas between opening 147 of vacuum chamber 143 and sheet S. Vacuum chamber port 145 is connected to a vacuum pump 152 driven by motor via hose 154. The vacuum pressure in vacuum chamber 143 should be enough to suck the liquid out of the of the pores of the fabric. Thus, after passing through suctioning zone 140, the fabric can appear dry by visual inspection, although it is possible that some water remains in some of the smaller pores of the fabric (e.g., in micro- or nanopores in the fabric). In some embodiments, vacuum pump 152 can be a pump with a rated vacuum pressure of about −49 cm of mercury (Hg). In some embodiments, the vacuum pressure in vacuum chamber 143 can be about −45 cm of Hg. In some embodiments, the residual moisture in the fabric after exiting suctioning zone 140 is about 10% or less (e.g., about 10% or less, about 9% or less, about 8% or less, about 7% or less, about 6% or less, about 5% or less, about 4% or less, about 3% or less, about 2% or less, or about 1% or less) compared to the weight of the fabric.

Continuing with reference to FIG. 1, sheet S is pulled away from suctioning zone 140 using winder 180 over guide roller 150 and passed into oven 170 on belt 172, which can be porous. Oven 170 can comprise one or more ovens (e.g., 1, 2, 3, 4 or more ovens). Oven or ovens 170 can thus extend over several meters to provide a residence time for sheet S at elevated temperatures to provide for drying of sheet S to a desired level of dryness. Heating and other controls for oven 170 are provided by controller 174, which is operatively connected to oven 170. In the case of a series of ovens, each successive oven can be at a different temperature, such as a lower temperature in each successive oven. A representative range of temperatures is 60° C. to 70° C. After drying sheet S is collected on winder 180. Suitable ovens, controllers, water pumps, and winders are commercially available.

Figure 2:
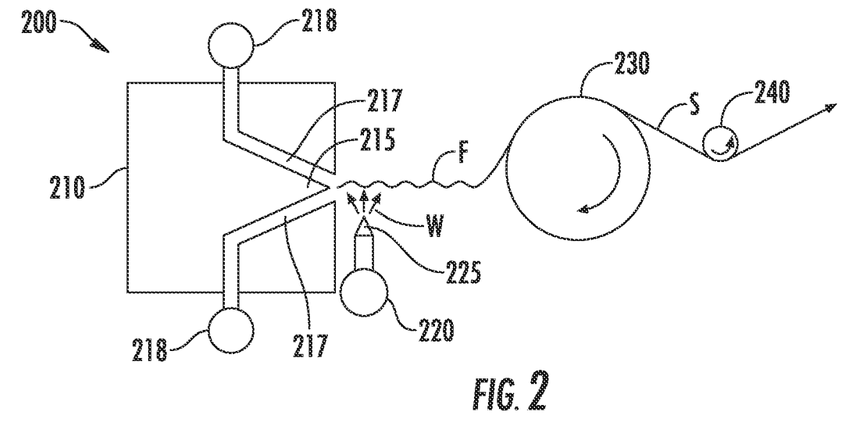
FIG. 2 is a schematic diagram illustrating an exemplary water quenching apparatus for saturating a nonwoven fiber sheet with liquid according to the presently disclosed subject matter.

Exemplary apparatus 200 for saturating a fabric (e.g., a nonwoven fabric) is shown in FIG. 2. Apparatus 200 includes die body 210 of a meltblowing apparatus. Die body 210 includes fiber spinning nozzle 215 between channels 217 through which a stream of hot air can be flowed from air manifolds 218. After fiber F exits die body 210, it is sprayed with liquid W (e.g., water) from water quenching nozzle 225, which is attached to water manifold 220. After saturation, fiber F forms a nonwoven fabric sheet S on collector 230, which can be guided to a fabric winder (not shown) via guide roller 240, and then to an apparatus of FIG. 1, or to an apparatus comprising a suction zone as shown in FIG. 1.

In some embodiments, the presently disclosed subject matter provides an apparatus for preparing an electret. In some embodiments, the apparatus comprises:
(i) one or more nozzles and a solid roller, wherein the one or more nozzles are positioned beneath the solid roller and are configured to direct one or more jets of water upward to the solid roller;
(ii) a vacuum chamber comprising a vacuum port and an opening; and
(iii) a series of rollers configured to transfer a fabric sheet from a first location above the one or more nozzles and under the solid roller to a second location above the opening of the vacuum chamber. In some embodiments, the one or more nozzles are attached to a water manifold configured to provide water to the one or more nozzles. In some embodiments, three or more nozzles are attached to the water manifold in a linear fashion such that they can direct water jets in a line along the width of a fabric sheet located under the solid roller.

In some embodiments, the apparatus comprises a water reservoir configured to collect water reflected from the bottom surface of the sheet, optionally wherein said water manifold is positioned above the water reservoir or above any water collected in the water reservoir. In some embodiments, the water reservoir is connected to a water pump. The pump can be used, for example, to pump water that was reflected off the bottom surface of a fabric sheet into the reservoir, to the water manifold, or back to a purification system, thereby recycling the water.

In some embodiments, the apparatus further comprises a porous belt configured transport the sheet over the opening of the vacuum chamber. In some embodiments, the opening in the vacuum chamber is a slit that has a length that spans the width of the fabric being processed. In some embodiments, the slit has a width of between about 1/32" and about 5" (e.g., about 1/32", about 1/16", about 1/8", about 1/4", about 1/2", about 1", about 2", about 3", about 4", or about 5"). In some embodiments, the slit is about 3 mm (or about 1/8" wide). In some embodiments, a narrower slit, e.g., about 1/16" can be employed. In some embodiments, wider slits can be employed, e.g., using higher vacuum power.

In some embodiments, the apparatus further comprises one or more ovens, a water purification system, one or more controllers (e.g., for the one or more ovens), one or more water lines, one or more motors, a vacuum pump, a vacuum hose, a winder, and an unwinder. Suitable water purification systems, ovens, controllers, vacuum pumps and hoses, water pumps and lines, and winders/unwinders are commercially available.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method of making an electret, the method comprising:
(a) providing a sheet comprising a nonwoven web of thermoplastic fibers;
(b) passing the sheet under a solid roller wherein the top surface of the sheet is in contact with the solid roller while simultaneously impinging the bottom surface of the sheet with one or more jets of water, thereby saturating the sheet with water to provide a saturated sheet; and
(c) transporting the saturated sheet away from the solid roller and the one or more jets of water to a position over an opening of a vacuum chamber and removing the water from the saturated sheet via suction to provide a charge, thereby providing an electret.

2. The method of claim 1, wherein the method further comprises drying the sheet.

3. The method of claim 1, wherein the thermoplastic fibers comprise a polyolefin.

4. The method of claim 3, wherein the polyolefin is polypropylene.

5. The method of claim 1, wherein the thermoplastic fibers comprise an additive.

6. The method of claim 1, wherein the thermoplastic fibers are melt blown or spunbonded fibers.

7. The method of claim 1, wherein the nonwoven web has a basis weight of between about 15 grams per square meter (gsm) and about 40 gsm.

8. The method of claim 1, wherein the one or more jets of water are directed to the bottom surface of the sheet at a pressure between about 75 pounds per square inch (psi) and about 1,000 psi.

9. The method of claim 1, wherein the one or more jets of water are directed to the bottom surface of the sheet using one or more nozzles having an equivalent orifice diameter between about 0.011 inches and about 0.075 inches.

10. The method of claim 1, wherein the water has a conductivity of less than 10 microsiemens ($\mu$S).

* * * * *